May 27, 1924.   1,495,366
A. E. WILLIAMSON ET AL
DRIVING MECHANISM FOR MOTOR VEHICLES
Filed Feb. 2, 1921   2 Sheets-Sheet 2
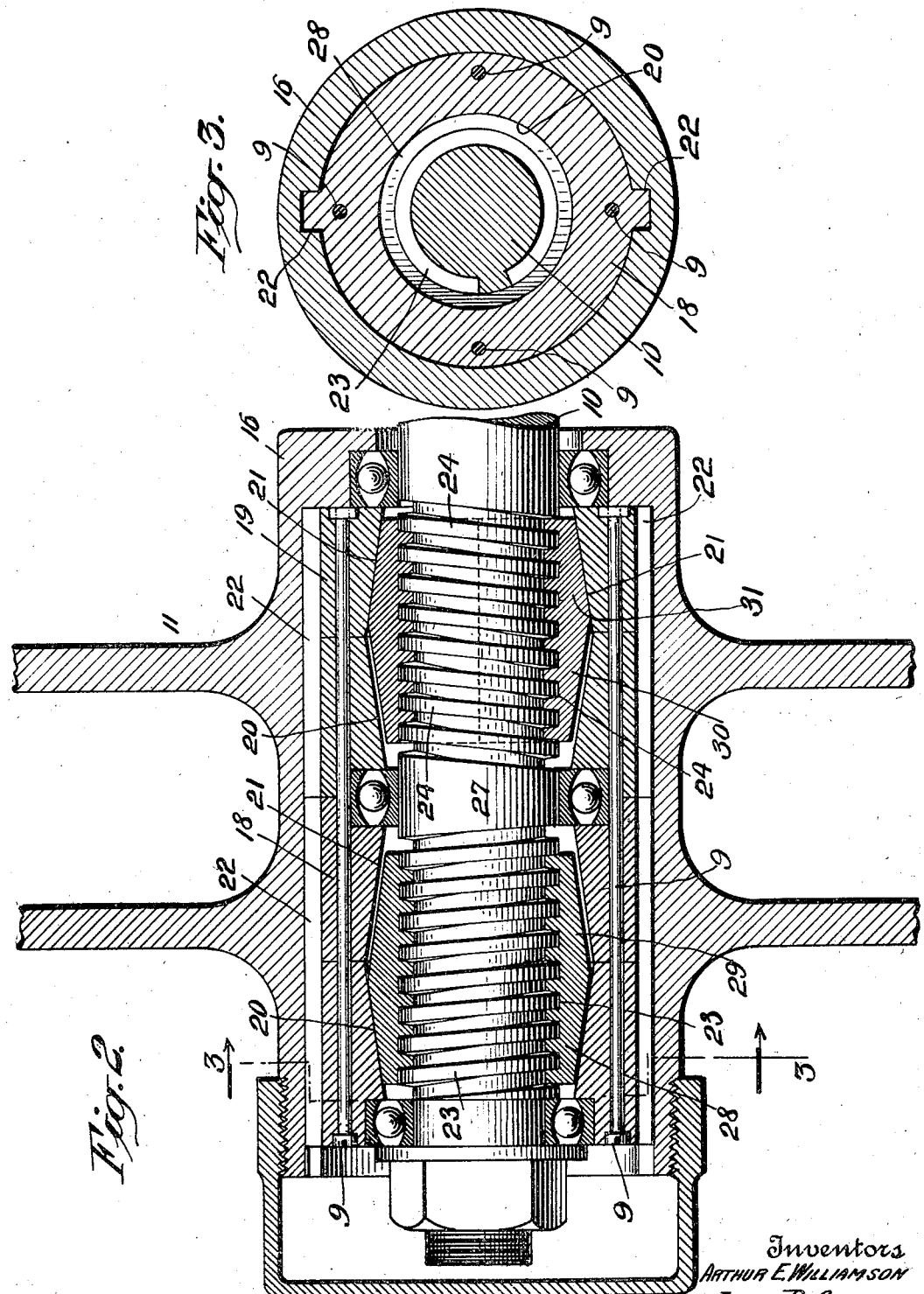
Inventors
ARTHUR E. WILLIAMSON
JOHN R. CAVE
By their Attorney
Chas. C. Gill

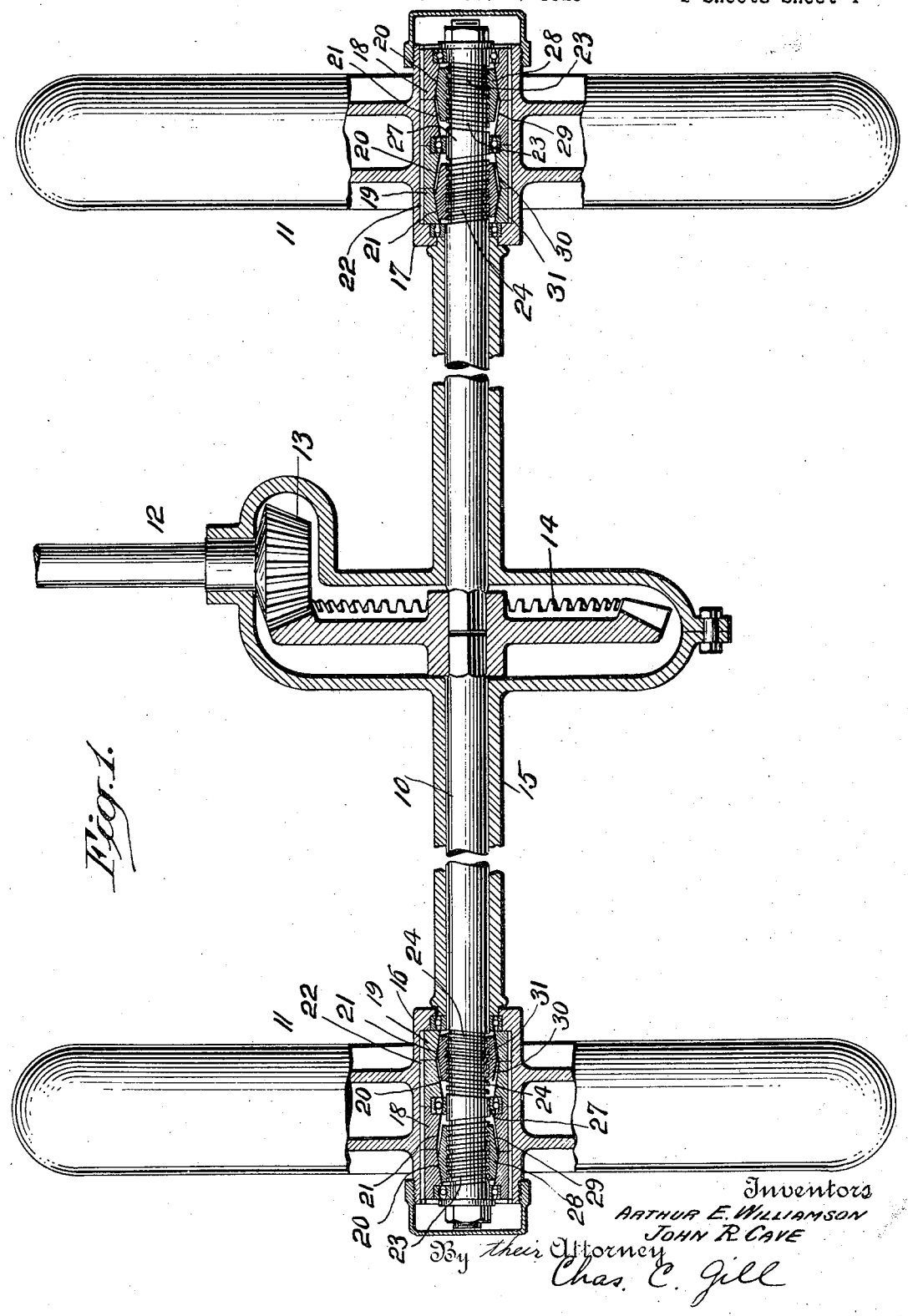

Patented May 27, 1924.

1,495,366

UNITED STATES PATENT OFFICE.

ARTHUR E. WILLIAMSON, OF JERSEY CITY, NEW JERSEY, AND JOHN R. CAVE, OF BAYSIDE, NEW YORK.

DRIVING MECHANISM FOR MOTOR VEHICLES.

Application filed February 2, 1921. Serial No. 441,751.

*To all whom it may concern:*

Be it known that we, ARTHUR E. WILLIAMSON, a citizen of the United States, and a resident of Jersey City, in the county of Hudson and State of New Jersey, and JOHN R. CAVE, a citizen of the United States, and a resident of Bayside, in the county of Queens and State of New York, have jointly invented certain new and useful Improvements in Driving Mechanism for Motor Vehicles, of which the following is a specification.

The invention relates particularly to the rear axles of automobiles and motor vehicles generally and to means for imparting motion therefrom to the rear driving wheels of such vehicles, and the invention consists in the novel features and cooperative arrangements of parts hereinafter described, and particularly pointed out in the claims.

One purpose of the invention is to displace the differential gear or other type of balance gear at present employed in connection with the rear axles of automobiles and avoid well-known objections incident to the use thereof, one of which objections is that with the conventional type of differential gear maximum rotational tendency is given to the wheel which shows the least tractive effort or to that wheel which offers the least resistance, as, for example, the wheel which may be resting on an icy or slippery road surface or the wheel which may momentarily leave the ground when the vehicle is traveling rapidly over a rough road.

In accordance with our invention equal traction is distributed to both driving wheels irrespective of the nature of the road or surface beneath the tires, and hence the invention, as one advantage thereof, makes starting on icy or slippery roads when only one wheel is on resistable ground possible. A further decided advantage of our invention is that it greatly facilitates travel over muddy roads. Equal traction distributed to both the main driving wheels greatly minimizes the tendency of the wheels to skid or resort to side slipping when the vehicle is driven over smooth pavements, which, when the conventional type balance gear is used, would favor greater rotational effort of one wheel over the other. We may mention also that with the use of our invention, when the driving power has been cut off and the vehicle is traveling by its own momentum or going down an incline, the kinetic energy of the vehicle may be utilized to the maximum degree.

In carrying out our invention we make the rear axle of the vehicle, either in fact or effect, in one integral solid piece from end to end, and provide at the ends of said axle and cooperating therewith and with the driving wheels, movable self-releasing driving elements which will bind the wheels and axle together when power is imparted to said axle to drive the vehicle forwardly and movable self-releasing driving elements which will bind the wheels and axle together when reverse motion is imparted to the axle to cause the vehicle to travel rearwardly, whereby both wheels receive equal rotational effort. In detail, we, in one form illustrative of our invention, provide right and left hand threads on each end of the axle and on these threads mount conical frustums whose bores are threaded to engage said axle threads and we provide the wheels, concentrically therewith and with the axle, with hollow frustums which match and loosely encompass said conical frustums. When the axle is actuated to drive the vehicle forwardly, the right hand threads thereon will cause, at each wheel, one conical frustum to move outwardly while the left hand threads thereon will cause the other conical frustum to move inwardly, said frustums then entering into binding engagement with their enclosing hollow frustums to bind the wheel and axle together, and when the axle is reversed to move the vehicle rearwardly, the right and left hand threads on the ends of said axle will, at each wheel, reverse the direction of travel of said conical frustums, releasing their outer ends from the enclosing hollow frustums and causing their inner or adjacent ends to engage adjacent surfaces of said hollow frustums and bind the axle and wheel together. The conical frustums are made double, having surfaces which from a middle vertical line converge outwardly in opposite directions, and one of these conical frustums is on the right hand threads of the axle and the other on the left hand threads thereof. The enclosing hollow frustums are made double, having surfaces to engage the outer ends of the conical frustums when said frustums are moved outwardly in a direction from each other and surfaces to engage the inner ends of said conical frustums when said frustums are moved inwardly toward each other.

We preferably provide a set of right hand threads and a set of left hand threads on each end of the driving axle and a double conical frustum on each set of these threads, and two hollow enclosing frustums for said two double conical frustums, said hollow enclosing frustums preferably being formed in sleeves whose sections are bolted together and keyed within the hubs of the wheels.

In accordance with our invention, we dispense entirely with the conventional differential gear and solid driving connections between axles and main driving wheels.

The invention will be fully understood from the detailed description hereinafter presented, reference being had to the accompanying drawings, in which:

Fig. 1 is a plan view, partly in horizontal section and partly broken away, of the rear axle and wheels of an automobile equipped with the mechanism of our invention;

Fig. 2 is an enlarged section, partly broken away, taken centrally through one of the wheels, the rear axle being shown as broken away near the wheel, and Fig. 3 is a section through the same, taken on the dotted line 3—3 of Fig. 2.

In the drawings, 10 designates the rear axle of an automobile or motor vehicle, which axle may be in one piece or two pieces keyed together, 11 the main driving wheels, 12 the usual propeller shaft to be actuated in the customary way from the motor of the vehicle, 13 a beveled pinion wheel rigidly secured on the end of said propeller shaft, 14 a gear-wheel rigid on the rear axle 10 and meshing with said wheel 13, and 15 a casing enclosing the rear axle 10 and gear-wheels 13, 14, and which casing may be of any suitable construction and at present is indicated as made in two parts bolted together. The axle 10 is illustrated as made in two parts whose inner meeting ends are squared and receive the hub of the gear-wheel 14, and this in effect renders the rear axle as one solid axle, and whenever convenient said axle will be formed in one integral piece.

The ends of the rear axle 10 extend within the hubs 16, 17, respectively, of the driving wheels 11, and within these hubs and intermediate the inner walls of the same and the ends of the axle 10 are keyed sleeves 18, 19 each of which is formed in its bore with reversely disposed frustum surfaces 20, 21, the larger ends of said frustums meeting at the center of the sleeve and said frustums thence having outwardly converging surfaces toward the ends of the sleeve, as illustrated on an enlarged scale in Fig. 2. The frustums 20, 21 correspond with each other, except that said frustums are reversed in direction to each other, and the sleeves 18, 19 in all essential respects correspond with each other and both sleeves, by means of keys 22, are interlocked with the hub of the wheel and impart motion thereto. Each sleeve 18, 19, for each wheel, is formed of two substantially equal sections matched together, as shown more clearly in Fig. 2, and the sections of the sleeves 18, 19 and the sleeves themselves may be secured together in end to end relation by means of bolts 9 extending through said sections and sleeves as clearly represented in Figs. 2 and 3. The sleeves 18, 19 are each formed in two sections for convenience of manufacture and assembly.

Each end of the axle 10 is formed with a set of left hand threads 23 and a set of right hand threads 24, the two sets of threads being separated by a plain portion 27 of the axle, which is mounted in ball-bearings at said portion 27 and at the opposite ends of the wheel hub, as shown in Fig. 2. Upon the left hand threads 23 are mounted double conical frustums having outwardly converging surfaces forming two oppositely disposed cones 28, 29, respectively, and upon the right hand threads 24 are mounted similar double conical frustums having outwardly converging cone surfaces forming two oppositely disposed cones 30, 31, respectively, the bores of said conical frustums having spiral threads in mesh with and to travel on the left hand threads 23 and right hand threads 24, respectively.

The motion of the rear axle 10 is transmitted to the driving wheels 11 by the action of the threads on the ends of said axle wedging the conical frustums 28, 29 and 30, 31, as the case may be, against the matching conical surfaces therefor provided by the enclosing sleeves 18, 19, in accordance with the direction of travel of the vehicle. If the axle 10 is rotated in a direction to cause the forward travel of the vehicle, the left hand threads 23 will move the inner conical frustums 29 inwardly against the surfaces 21 of the sleeves 18 and the right hand threads 24 will move the inner conical frustums outwardly or in a direction from each other and bind the frustums 30 against the surfaces 20 of the sleeves 19, this taking place at both ends of the axle 10. The wedging of the conical frustums 28, 31 against the sleeves 18, 19 results in the axle and wheels 11 being connected together and in motion being imparted to said wheels from said axle. During the forward travel of the vehicle at a given rate of speed, the threads 23, 24 at each end of the axle will maintain the engagement of the conical frustums 28, 31 with the sleeves 18, 19 and thus assure a fixed driving relation of the conical frustums, sleeves 18, 19 and wheels 11. When power is imparted to the axle 10 for reversing its motion and the direction of travel of the vehicle, the left and right hand threads 23, 24 will act reversely on the double-conical frustums, moving them, at each wheel, in a direction from each other, and thereby cause the cones 28 to bind against the cone surfaces 20 of the sleeves 18 and the cones 31 to bind against the cone surfaces 21 of the sleeves 19, said conical frustums thus becoming wedged against said sleeves and serving as means for binding the axle 10 and wheels 11 together so that the reverse motion of the axle may be imparted to said wheels. When the motion of the axle is thus reversed and the double conical frustums are moved in a direction from each other, their inner conical surfaces or cones 29, 30 become instantly released from the sleeves 18, 19. When power is cut off from the rear axle 10 as might be the case when coasting or going down an inclined surface or road-bed, there will be no action of the axle 10 to move the double-conical frustums, and at this time the said frustums will loosen from their frustum sleeves and said sleeves may rotate freely on the ball-bearings around the axle and the double-conical frustums thereon.

It will be seen, therefore, that when power is applied to the axle 10 for driving the vehicle forwardly, the double conical frustums at each end of the axle move in a direction toward each other and engage the inner sections of their enclosed sleeves 18, 19 and effect the forward rotation of the driving wheels 11, that when power is applied to the axle 10 for moving the vehicle backwardly, the double-conical frustums are released from the inner sections of the sleeves 18, 19 and move in a direction away from each other and engage the outer sections of said sleeves, thereby serving to bind the axle and wheels 11 together and reverse the direction of rotation of said wheels, and that when no power is applied to the axle 10 or when power is cut off therefrom so that said axle is not in a state of rotation, both conical frustums are released from their wedging pressure on the sleeves 18, 19 and permit the driving wheels to rotate freely under momentum or the kinetic energy of the moving vehicle.

The double-conical frustums are driving elements and each is automatically releasable on the reversal of the direction of travel of the vehicle or of the rotation of the axle 10, the inner ends of said conical frustums, or cones 29, 30 being driving elements when the vehicle is to move in one direction and becoming automatically released as driving elements when the axle 10 is reversed in motion to cause the vehicle to travel in the opposite direction, at which time the outer ends of said double-conical frustums, or cones 28, 31 become wedged to their enclosing hollow frustums and communicate the motion of the axle 10 to the driving wheels, the outer ends of said conical frustums or cones 29, 30 automatically releasing, when the direction of travel of the vehicle is again reversed.

Since the rear axle 10 is in effect one continuous solid axle and since the threads on the ends thereof bind the double-conical frustums into binding relation with the wheels, when the vehicle is to move forwardly as well as when it is to move backwardly, equal traction is distributed to both wheels, and to accomplish this purpose is one of the objects of our invention. Our invention eliminates the objections hereinbefore briefly referred to, as well as other objections, incident to the use of differential gears and solid connections between the sections of a rear axle and the driving wheels.

For convenience in assembling, the inner double-conical frustums affording the cones 30, 31 may be made in two longitudinal halves applied upon the threads 24 and bolted together or not as may be expedient.

We are aware that the details of mechanism shown in the drawings and hereinbefore described may be modified in many respects within the scope of the appended claims, and therefore we do not limit our invention to details of form and arrangement otherwise than the prior art and the appended claims may require.

What we claim as our invention and desire to secure by Letters Patent, is:

1. In driving mechanism for motor vehicles wherein a driving axle actuated from the motor is provided and wheels loosely mounted on the ends of the axle and adapted to revolve thereon with clutch mechanisms intermediate said axle and each of said wheels, a clutch mechanism comprising horizontally extending sleeves concentric and rigid with the wheel, movable self-releasing driving elements connected with the axle at the end thereof and automatically engageable thereby with a plurality of inner circumferential surfaces of said sleeves when the axle is rotated in one direction, said surfaces being at opposite sides of the central plane of the wheel, and movable self-releasing driving elements connected with the axle at the end thereof and automatically engageable thereby with other plural inner circumferential surfaces of said sleeves when the axle is reversed in rotation, said surfaces being at opposite sides of the central plane of the wheel.

2. In driving mechanism for motor vehicles wherein a driving axle actuated from the motor is provided and wheels loosely mounted on the ends of the axle and adapted to revolve thereon with clutch mechanisms intermediate said axle and each of said wheels, a clutch mechanism comprising screw threads on the end of the axle, double conical frustums forming two cones whose smaller ends are at the outer ends of the frustums and which frustums have interior threads meshing with said screw-threads and hollow conical frustums connected with the wheel and matching and enclosing said cones, said hollow conical frustums permitting limited travel of the cones on said threads and becoming wedged with one set thereof when the axle is rotated in one direction and with the other set thereof when the axle is reversed in rotation.

3. In driving mechanism for motor vehicles wherein a driving axle actuated from the motor is provided and wheels loosely mounted on the ends of the axle and adapted to revolve thereon with clutch mechanisms intermediate said axle and each of said wheels, a clutch mechanism comprising right hand threads and left hand threads on the end of the axle, double cones on and threaded to mesh with said right hand threads and said left hand threads and double hollow conical frustums concentric and rigid with the wheel and enclosing said cones, said hollow conical frustums permitting limited travel of the cones on said threads and becoming wedged with outer opposite ends of the cones when the axle is rotated in one direction and with adjacent ends of said cones when the axle is rotated in a reverse direction, said double-cones, double conical frustums and right and left hand threads at the end of the axle being at opposite sides of the central plane of the wheel.

4. In driving mechanism for motor vehicles wherein a driving axle actuated from the motor is provided and wheels loosely mounted on the ends of the axle and adapted to revolve thereon with clutch mechanisms intermediate said axle and each of said wheels, a clutch mechanism comprising right hand threads and left hand threads on the end of the axle, cones set reversely to each other so that their smaller ends project outwardly and said cones being threaded to respectively mesh with said right and left hand threads, and hollow frustums connected with the wheel and enclosing said cones and having their smaller ends extended outwardly, said hollow frustums permitting limited travel of the cones on said threads and becoming wedged with one set thereof when said axle is rotated in one direction and with the other set thereof when the axle is rotated in a reverse direction.

5. In driving mechanism for motor vehicles wherein a driving axle actuated from the motor is provided and wheels loosely mounted on the ends of the axle and adapted to revolve thereon with clutch mechanisms intermediate said axle and each of said wheels, a clutch mechanism comprising right hand threads and left hand threads on the end of the axle, a plurality of double-cones at the end of the axle on and threaded to mesh with said right hand threads and said left hand threads respectively, and the cones of each double cone having their larger ends adjacent to each other, and hollow frustums in pairs concentric and rigid with the wheel and enclosing said double cones, said hollow frustums permitting limited travel of the cones on said threads and becoming wedged with the outer cone of each double cone when the axle is rotated in one direction and with the inner cone of each double cone when the axle is reversed in motion, said double cones, frustums and right and left hand threads at the end of the axle being at opposite sides of the central vertical plane of the wheel.

In testimony whereof we hereunto affix our signatures.

ARTHUR E. WILLIAMSON.
JOHN R. CAVE.